J. K. WILLIAMS.
VULCANIZER.
APPLICATION FILED DEC. 19, 1917.
1,308,517.
Patented July 1, 1919.
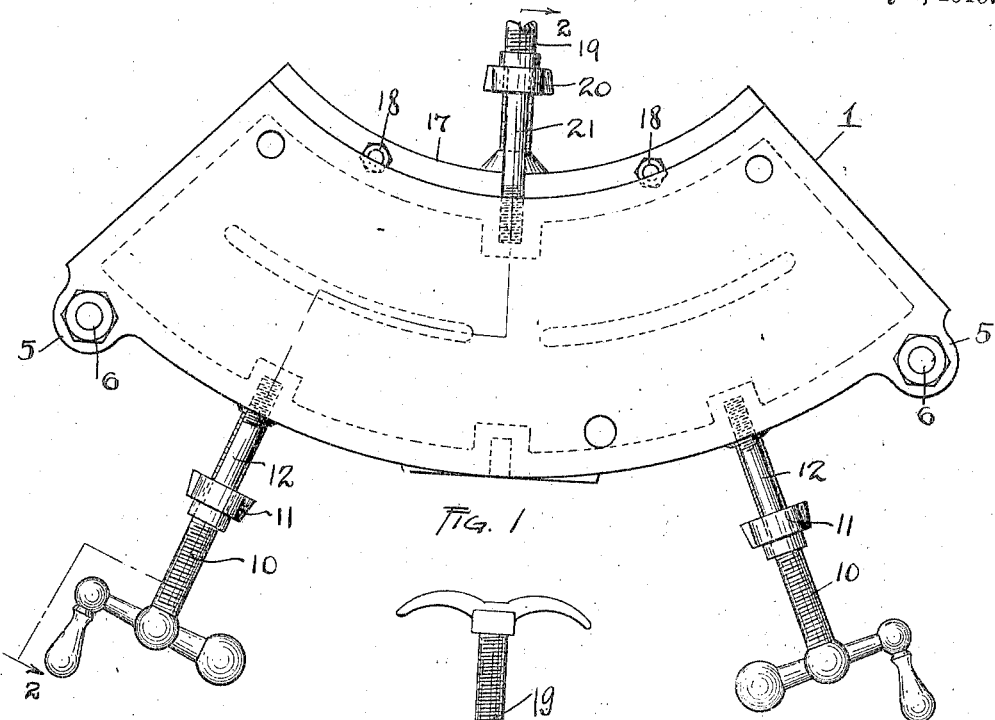
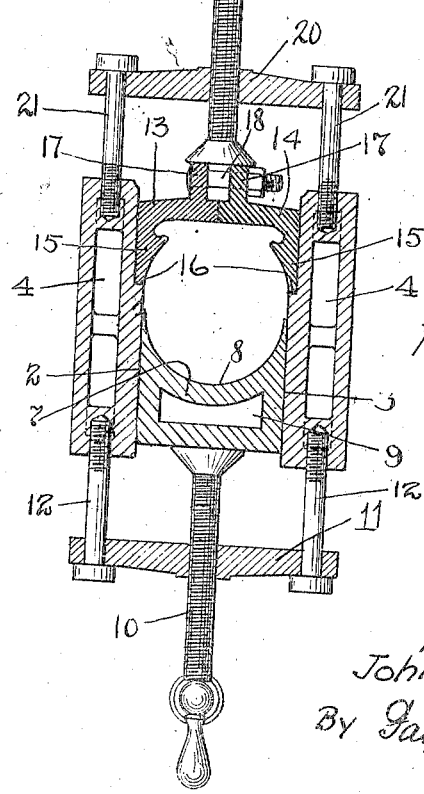
INVENTOR
John K. Williams
By Fay, Oberlin & Fay
ATTORNEYS.

UNITED STATES PATENT OFFICE.

JOHN K. WILLIAMS, OF AKRON, OHIO, ASSIGNOR TO THE WILLIAMS FOUNDRY AND MACHINE COMPANY, OF AKRON, OHIO, A CORPORATION OF OHIO.

VULCANIZER.

1,308,517.     Specification of Letters Patent.     Patented July 1, 1919.

Application filed December 19, 1917. Serial No. 207,827.

*To all whom it may concern:*

Be it known that I, JOHN K. WILLIAMS, a citizen of the United States, and a resident of Akron, county of Summit, and State of Ohio, have invented a new and useful Improvement in Vulcanizers, of which the following is a specification, the principle of the invention being herein explained and the best mode in which I have contemplated applying that principle, so as to distinguish it from other inventions.

The present invention, relating, as indicated, to vulcanizers, is particularly concerned with an improved repair vulcanizer, of a type which is well known and which is in common use for the repairing of individual tire casings when it is desired to insert and vulcanize into position a short section of casing. One of the objects of the invention is the provision of such a vulcanizer which is simple to operate and less liable to breakage than those now in general use, while other objects will appear from the following description. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1 is a side elevation of my improved vulcanizer apart from its support; and Fig. 2 is a section of the same on the line 2—2 in Fig. 1.

In Fig. 1 there is shown a frame 1 curved to conform to the curvature of tires of the desired size and provided with spaced walls 2 and 3, which are hollow and are formed with steam chambers 4. The side members or plates 2 and 3 are formed at either end with projecting bosses 5 adapted to receive bolts 6 for securely fastening together these two members. The ordinary repair vulcanizer, which is in general use for the repairing of tire casings, is provided with a bottom portion formed integral with the two side members and interiorly curved to conform with the configuration of the tire that is to be repaired. In such repair vulcanizers, the tire is forced into firm contact with the side walls and the bottom of the vulcanizer by means of bead strips or plates conforming to the shape of the beads of the tire and movable vertically between the side walls of the vulcanizer to force the tire against the bottom of the chamber. The upper and removable bead members have to be formed with thin edges in order not to wedge the edges of the tire away from the walls of the vulcanizer. When these bead members are removed after the vulcanizing operation, they are often thrown carelessly on the floor and even when they are formed of cast steel, the thin edges or fins are often broken. Cast steel is an expensive material, which should not have to be used in a device of this character, but it has heretofore been impossible to avoid its use for the above reason, and the present invention is intended to obviate the necessity of using such an expensive material by providing a vulcanizer in which the removable parts are not formed with any thin, breakable edges.

Referring again to Figs. 1 and 2 of the drawing, it will be seen that the bottom of the chamber formed between the side members 2 and 3 consists of a hollow, curved segment 7, the inner surface 8 of which is formed with the same curvature as the tires which are to be repaired, and the side walls of which are machined, in order to provide a tight sliding fit between the walls 2 and 3 of the frame, which are also machined to a smooth surface. This bottom member 7 is provided with a steam chamber 9 which may be connected with the steam chambers 4 of the side members or may be connected directly with a source of supply, as may be convenient. Adjustment of the bottom member 7 is secured by means of hand screws 10, of which there are two, operating in yokes 11, which are secured in fixed positions by means of bolts 12 engaging the two side members of the frame.

In order to keep the tire securely against the bottom member of the vulcanizer during the vulcanizing operation, I employ two bead members 13 and 14, which, when fitted together in the manner shown in Fig. 2, operate to engage the base flanges of the tire. These bead members 13 and 14 are provided with inwardly extending flanges 15, having square edges which seat against shoulders 16 formed in the walls 2 and 3 and the bead members are so formed that the portions of their inner walls adjacent to the shoulders 16 meet smoothly with the side walls 2 and 3, as may be seen in Fig. 2. Outwardly projecting flanges 17 are adapted to receive retaining bolts 18 which lock the two bead members together, and when in engagement on the tire the bead member is moved into engagement with the shoulders 16 by means of a hand bolt 19 in a yoke 20 which is mounted on the plates 21, as is customary in such devices.

In operation, the bead members 14 are first engaged firmly about the base flanges of the tire at the point which is to be repaired and the tire is then inserted in the space between the side walls 2 and 3 of the vulcanizer. The hand bolt 19 is then operated to force the flanges in the beads home against the shoulders 16 in the side walls and when these bead members are so positioned, the hand bolts 10 are turned until the sliding bottom member 7 is forced firmly against the tread portion of the tire. The only thin flanges or fins are those on the edges of the bottom member 7, and as this member need never be removed from the vulcanizer, there is no possibility of breakage or injury to these thin fins, while the operation of the present vulcanizer is fully as simple and convenient as in those heretofore used.

I have not thought it necessary to describe the steam chambers formed in the various parts of the vulcanizer as these serve the same purpose and are similarly arranged and operated as the corresponding features of previous vulcanizers of this same general type.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a vulcanizer, the combination of heating chambers adapted to receive a tire casing therebetween, said chambers being provided with inset shoulders in their adjacent walls, tire-engaging bead members adapted to fit against such shoulders, and a member slidably mounted between said chambers, said member conforming with the tread surface of the tire casing and having its edges adapted to smoothly meet the walls of said chambers.

2. In a vulcanizer, the combination of heating chambers adapted to receive a tire casing therebetween, said chambers being provided with inset shoulders in their adjacent walls, tire-engaging bead members adapted to fit against such shoulders, a hollow member mounted between said chambers, said member conforming with the tread surface of the tire casing and having narrow edges adapted to meet smoothly the walls of said chambers, and means adapted to move said member between said chambers toward and away from said bead members.

3. The combination of a vulcanizing chamber open at opposite sides and provided with stop members therein, bead members adapted to engage the base of a tire and movable within said chamber into engagement with said stop members, and movable means mounted within said chamber and operable to engage against, and partially inclose, the tread portion of a tire held in said chamber.

4. The combination of a vulcanizing chamber open at opposite sides and provided with stop members therein, bead members adapted to engage the base of a tire and movable within said chamber into engagement with said stop members, and movable means mounted within said chamber and operable to engage against, and partially inclose, the tread portion of a tire held in said chamber, the walls of said vulcanizing chamber and said movable means being provided with means adapted to heat the same, and therethrough, such tire.

Signed by me, this 8 day of Dec., 1917.

JOHN K. WILLIAMS.